United States Patent
Yoo et al.

(10) Patent No.: US 11,936,452 B2
(45) Date of Patent: Mar. 19, 2024

(54) NEURAL NETWORK BASED CHANNEL STATE INFORMATION FEEDBACK

(71) Applicant: QUALCOMM Incorporated, San Diego, CA (US)

(72) Inventors: Taesang Yoo, San Diego, CA (US); Weiliang Zeng, San Diego, CA (US); Naga Bhushan, San Diego, CA (US); Krishna Kiran Mukkavilli, San Diego, CA (US); Tingfang Ji, San Diego, CA (US); Yongbin Wei, La Jolla, CA (US); Sanaz Barghi, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 16/805,467

(22) Filed: Feb. 28, 2020

(65) Prior Publication Data

US 2021/0273707 A1   Sep. 2, 2021

(51) Int. Cl.
*H04B 7/06*        (2006.01)
*G06N 20/00*       (2019.01)
*H04B 7/0456*      (2017.01)

(52) U.S. Cl.
CPC ........... *H04B 7/0626* (2013.01); *G06N 20/00* (2019.01); *H04B 7/0486* (2013.01); *H04B 7/0639* (2013.01)

(58) Field of Classification Search
CPC .... H04B 7/0626; H04B 7/0486; H04B 7/639; G06N 20/00
See application file for complete search history.

(56) References Cited

U.S. PATENT DOCUMENTS

| 11,483,042 B2* | 10/2022 | Xue ..................... H04L 1/1861 |
| 2012/0063500 A1* | 3/2012 | Wang .................... H04W 24/10 375/224 |

(Continued)

FOREIGN PATENT DOCUMENTS

| CN | 109921882 A | 6/2019 |
| CN | 110099017 A | 8/2019 |

(Continued)

OTHER PUBLICATIONS

International Search Report and Written Opinion—PCT/US2021/017022—ISA/EPO—dated Jun. 4, 2021.

(Continued)

*Primary Examiner* — Steven S Kelley
(74) *Attorney, Agent, or Firm* — QUALCOMM Incorporated

(57) ABSTRACT

Various aspects of the present disclosure generally relate to neural network based channel state information (CSI) feedback. In some aspects, a device may obtain a CSI instance for a channel, determine a neural network model including a CSI encoder and a CSI decoder, and train the neural network model based at least in part on encoding the CSI instance into encoded CSI, decoding the encoded CSI into decoded CSI, and computing and minimizing a loss function by comparing the CSI instance and the decoded CSI. The device may obtain one or more encoder weights and one or more decoder weights based at least in part on training the neural network model. Numerous other aspects are provided.

30 Claims, 12 Drawing Sheets

(56) References Cited

U.S. PATENT DOCUMENTS

| | | | | |
|---|---|---|---|---|
| 2012/0257567 | A1* | 10/2012 | Abraham | H04L 1/0003 370/328 |
| 2014/0369302 | A1* | 12/2014 | Abraham | H04B 7/0452 370/329 |
| 2017/0195031 | A1* | 7/2017 | Onggosanusi | H04B 7/0632 |
| 2018/0367192 | A1* | 12/2018 | O'Shea | G06N 3/088 |
| 2019/0313397 | A1* | 10/2019 | Chen | H04L 5/0053 |
| 2020/0210884 | A1* | 7/2020 | Hadash | G06N 3/006 |
| 2021/0064996 | A1* | 3/2021 | Wang | H04L 5/0051 |
| 2021/0091837 | A1* | 3/2021 | Taherzadeh Boroujeni | H04W 76/27 |
| 2021/0144779 | A1* | 5/2021 | Vahdat | H04W 24/02 |
| 2021/0297135 | A1* | 9/2021 | Kim | H04B 7/0617 |
| 2021/0351885 | A1* | 11/2021 | Chavva | H04L 5/0048 |
| 2021/0376895 | A1* | 12/2021 | Xue | H04B 7/0626 |
| 2022/0368379 | A1* | 11/2022 | Tsai | H04B 7/0626 |
| 2023/0275787 | A1* | 8/2023 | Vitthaladevuni | H04L 25/0254 706/23 |

FOREIGN PATENT DOCUMENTS

| | | |
|---|---|---|
| CN | 110350958 A | 10/2019 |
| WO | 2018204632 A1 | 11/2018 |
| WO | 2020027503 A1 | 2/2020 |

OTHER PUBLICATIONS

Lu C., et al., "MIMO Channel Information Feedback Using Deep Recurrent Network", IEEE Communications Letters, IEEE Service Center, Piscataway, NJ, US, vol. 23, No. 1, Jan. 1, 2019 (Jan. 1, 2019), XP011696277, pp. 188-191,, ISSN: 1089-7798, DOI: 10.1109/LCOMM.2018.2882829 [retrieved on Jan. 7, 2019] abstract, sections 2, 3, figures 1-3.

Yang Q., et al., "Deep Convolutional Compression for Massive MIMO CSI Feedback", Arxiv.org, Cornell University Library, 201 OLIN Library Cornell University Ithaca, NY, 14853, arXiv: 1907.02942v1 [cs.IT], Jul. 2, 2019, 8 Pages, DOI: 10.1109/MLSP.2019.8918798, XP081438622, the whole document, Sections II-II; p. 2-p. 4p. 5, left-hand column, line 3-right-hand column, line 19; table 2, figures 1-3.

* cited by examiner

NEURAL NETWORK BASED CHANNEL STATE INFORMATION FEEDBACK

FIELD OF THE DISCLOSURE

Aspects of the present disclosure generally relate to wireless communication and to techniques and apparatuses for neural network based channel state information feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a device, may include obtaining a channel state information (CSI) instance for a channel, determining a neural network model including a CSI encoder and a CSI decoder, and training the neural network model based at least in part on encoding the CSI instance into encoded CSI, decoding the encoded CSI into decoded CSI, and comparing the CSI instance and the decoded CSI. The comparing may be part of, for example, computing and minimizing a loss function between the CSI instance and the decoded CSI. The method may include obtaining one or more encoder weights and one or more decoder weights based at least in part on training the neural network model.

In some aspects, a method of wireless communication, performed by a UE that transmits communications on a channel to a base station, may include encoding a first CSI instance for a channel estimate of the channel into first encoded CSI, based at least in part on one or more encoder weights that correspond to a neural network model associated with a CSI encoder and a CSI decoder, and transmitting the first encoded CSI to the base station.

In some aspects, a method of wireless communication, performed by a base station that receives communications on a channel from a UE, may include receiving first encoded CSI from the UE. The first encoded CSI may be a first CSI instance for the channel that is encoded by the UE, based at least in part on one or more encoder weights that correspond to a neural network model associated with a CSI encoder and a CSI decoder. The method may include decoding the first encoded CSI into first decoded CSI based at least in part on one or more decoder weights that correspond to the neural network model.

In some aspects, a device for wireless communication may include memory and one or more processors operatively coupled to the memory. The memory and the one or more processors may be configured to obtain a CSI instance for a channel, determine a neural network model including a CSI encoder and a CSI decoder, and train the neural network model based at least in part on encoding the CSI instance into encoded CSI, decoding the encoded CSI into decoded CSI, and comparing the CSI instance and the decoded CSI. The memory and the one or more processors may be configured to obtain one or more encoder weights and one or more decoder weights based at least in part on training the neural network model.

In some aspects, a UE that transmits communications on a channel to a base station may include memory and one or more processors operatively coupled to the memory. The memory and the one or more processors may be configured to encode a first CSI instance for a channel estimate of the channel into first encoded CSI, based at least in part on one or more encoder weights that correspond to a neural network model associated with a CSI encoder and a CSI decoder, and transmit the first encoded CSI to the base station.

In some aspects, a base station that receives communications on a channel from a UE may include memory and one or more processors operatively coupled to the memory. The memory and the one or more processors may be configured to receive first encoded CSI from the UE. The first encoded CSI may be a first CSI instance for the channel that is encoded by the UE, based at least in part on one or more encoder weights that correspond to a neural network model associated with a CSI encoder and a CSI decoder. The memory and the one or more processors may be configured to decode the first encoded CSI into first decoded CSI based at least in part on one or more decoder weights that correspond to the neural network model.

In some aspects, a non-transitory computer-readable medium may store one or more instructions for wireless communication. The one or more instructions, when executed by one or more processors of a device, may cause the one or more processors to obtain a CSI instance for a channel, determine a neural network model including a CSI encoder and a CSI decoder, and train the neural network model based at least in part on encoding the CSI instance into encoded CSI, decoding the encoded CSI into decoded CSI, and comparing the CSI instance and the decoded CSI, and obtain one or more encoder weights and one or more decoder weights based at least in part on training the neural network model.

In some aspects, a non-transitory computer-readable medium may store one or more instructions for wireless communication. The one or more instructions, when executed by one or more processors of a UE that transmits communications on a channel to a base station, may cause the one or more processors to encode a first CSI instance for a channel estimate of the channel into first encoded CSI, based at least in part on one or more encoder weights that correspond to a neural network model associated with a CSI encoder and a CSI decoder, and transmit the first encoded CSI to the base station.

In some aspects, a non-transitory computer-readable medium may store one or more instructions for wireless communication. The one or more instructions, when executed by one or more processors of a base station that receives communications on a channel from a UE, may cause the one or more processors to receive first encoded CSI from the UE, the first encoded CSI being a first CSI instance for the channel that is encoded by the UE, based at least in part on one or more encoder weights that correspond to a neural network model associated with a CSI encoder and a CSI decoder, and decode the first encoded CSI into first decoded CSI based at least in part on one or more decoder weights that correspond to the neural network model.

In some aspects, an apparatus for wireless communication may include means for obtaining a CSI instance for a channel, means for determining a neural network model including a CSI encoder and a CSI decoder, and means for training the neural network model based at least in part on encoding the CSI instance into encoded CSI, decoding the encoded CSI into decoded CSI, and comparing the CSI instance and the decoded CSI, and means for obtaining one or more encoder weights and one or more decoder weights based at least in part on training the neural network model.

In some aspects, an apparatus that transmits communications on a channel to another apparatus may include means for encoding a first CSI instance for a channel estimate of the channel into first encoded CSI, based at least in part on one or more encoder weights that correspond to a neural network model associated with a CSI encoder and a CSI decoder, and means for transmitting the first encoded CSI to the other apparatus.

In some aspects, an apparatus that receives communications on a channel from another apparatus may include means for receiving first encoded CSI from the other apparatus, the first encoded CSI being a first CSI instance for the channel that is encoded by the other apparatus, based at least in part on one or more encoder weights that correspond to a neural network model associated with a CSI encoder and a CSI decoder, and means for decoding the first encoded CSI into first decoded CSI based at least in part on one or more decoder weights that correspond to the neural network model.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
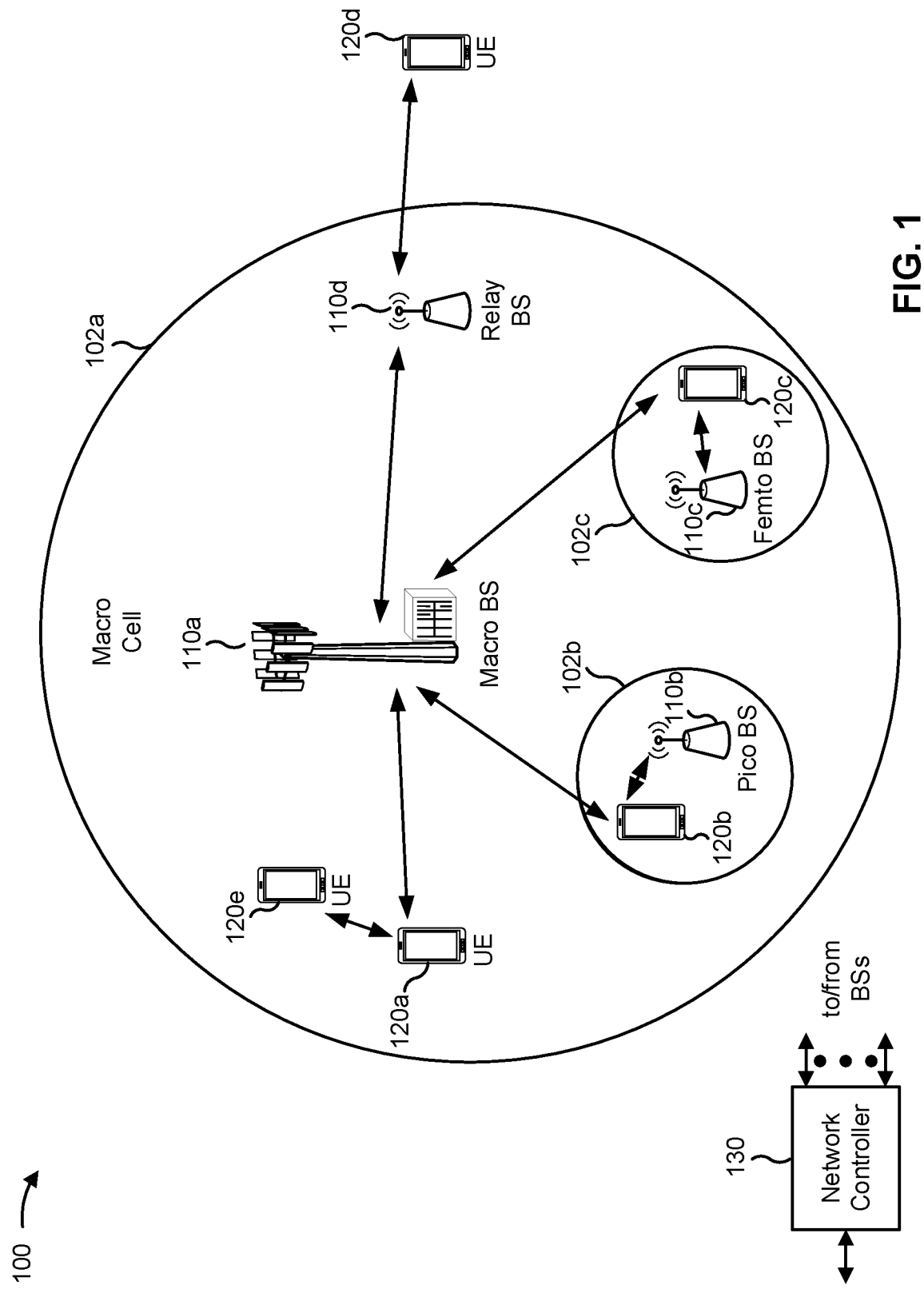
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
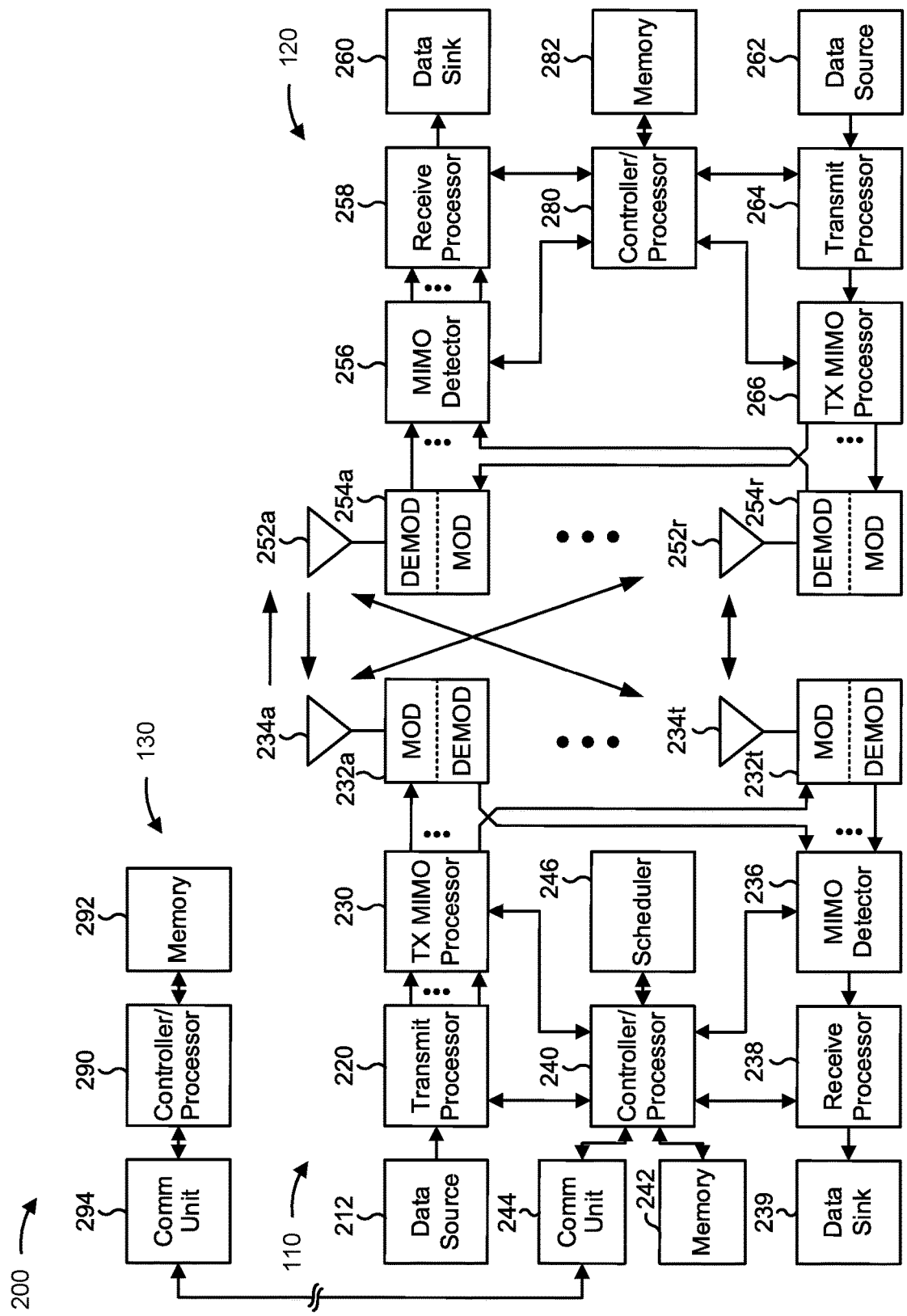
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with neural network based channel state information (CSI) feedback, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1000 of FIG. 10, process 1100 of FIG. 11, process 1200 of FIG. 12, and/or other processes as described herein. A scheduler 246 may schedule UEs for data transmission on the downlink and/or uplink. A device other than base station 110 or UE 120 may include such components to perform or direct the operations of, for example, process 1000 of FIG. 10.

In some aspects, a device, such as UE 120, may include means for obtaining a CSI instance for a channel, means for determining a neural network model including a CSI encoder and a CSI decoder, means for training the neural network model based at least in part on encoding the CSI instance into encoded CSI, decoding the encoded CSI into decoded CSI, and comparing the CSI instance and the decoded CSI, means for obtaining one or more encoder weights and one or more decoder weights based at least in part on training the neural network model, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for encoding a first CSI instance for a channel estimate of a channel to a base station into first encoded CSI, based at least in part on one or more encoder weights that correspond to a neural network model associated with a CSI encoder and a CSI decoder, means for transmitting the first encoded CSI to the base station, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a device, such as base station 110, may include means for obtaining a CSI instance for a channel, means for determining a neural network model including a CSI encoder and a CSI decoder, means for training the neural network model based at least in part on encoding the CSI instance into encoded CSI, decoding the encoded CSI into decoded CSI, and comparing the CSI instance and the decoded CSI, means for obtaining one or more encoder weights and one or more decoder weights based at least in part on training the neural network model, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for receiving first encoded CSI from a UE, the first encoded CSI being a first CSI instance for a channel to the UE that is encoded by the UE, based at least in part on one or more encoder weights that correspond to a neural network model associated with a CSI encoder and a CSI decoder, means for decoding the first encoded CSI into first decoded CSI based at least in part on one or more decoder weights that correspond to the neural network model, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
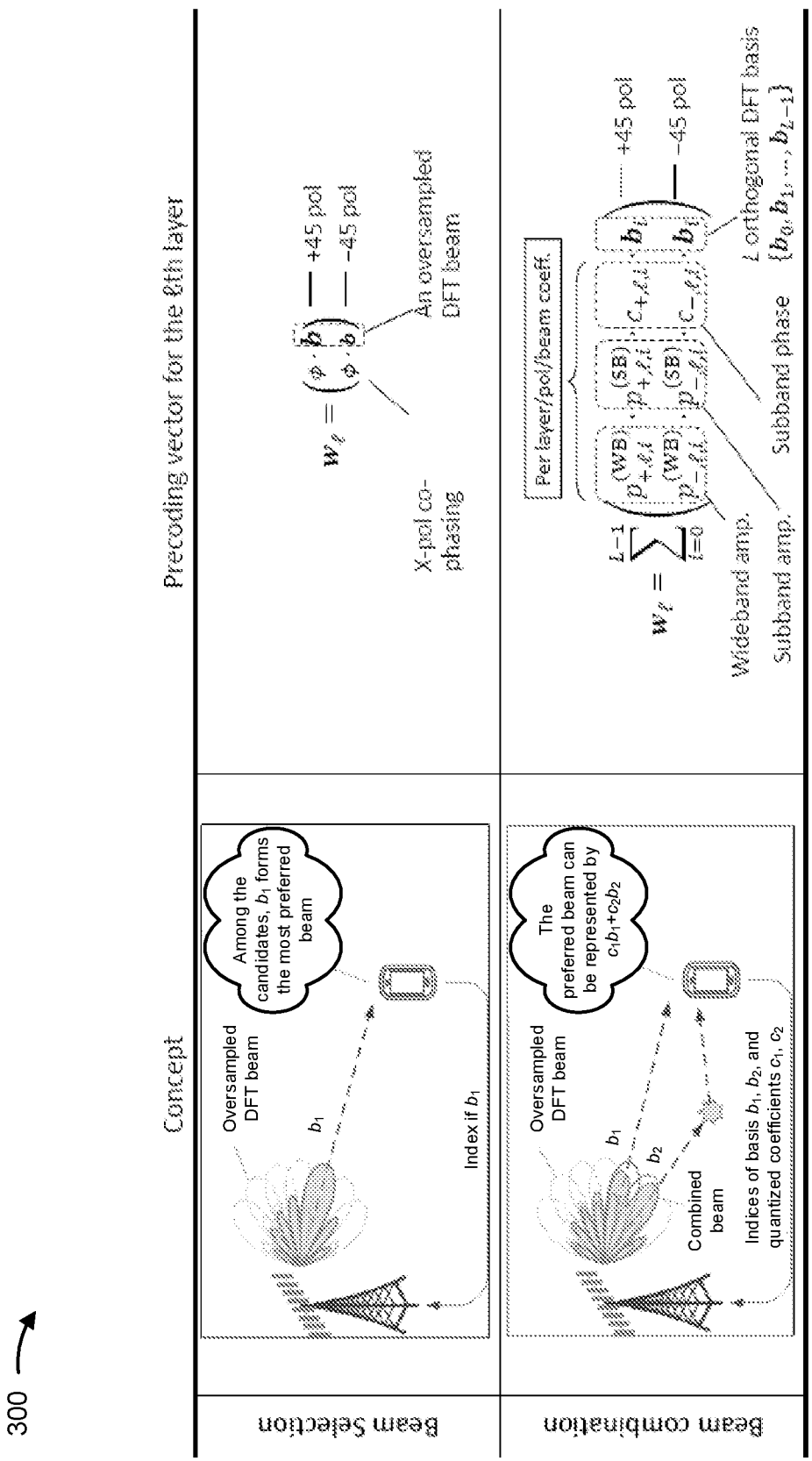
FIG. 3 illustrates an example of precoding vectors for channel state information (CSI) feedback.

FIG. 3 illustrates an example 300 of precoding vectors for CSI feedback. FIG. 3 shows a base station that may select a beam from among beam candidates or may select a combination of two beams.

A precoding vector may represent information for a selected beam that is sampled, such as oversampled with a Discrete-Fourier Transform (DFT). The precoding vector may correspond to a precoding matrix. The precoding matrix defines how data (layered data) gets distributed to each antenna port and may account for co-phasing, or an orthogonal offset of phases for multiple antennas. CSI feedback may include a precoding matrix indicator (PMI) that corresponds to the precoding matrix. FIG. 3 also shows a precoding vector for a combination of beams. For example, for a preferred beam $b_1$, a precoding vector may include coefficients and phases for the oversampled beam. For a combination of two beams $b_1$ and $b_1$, a precoding vector may include coefficients and phases for both beams, including for wideband and for subband.

CSI feedback may include Type-II feedback. As shown in FIG. 3, Type-II CSI feedback may include precoding vectors for different ranks. Rank may refer to the number of spatial layers of modulated symbols before precoding is applied, and a precoding vector may correspond to, or be replaced by, a precoding matrix. For example, for rank 1, precoding matrix $$W = \begin{bmatrix} \tilde{w}_{0,0} \\ \tilde{w}_{1,0} \end{bmatrix},$$

and W is normalized to 1. For rank 2, $$W = \begin{bmatrix} \tilde{w}_{0,0} & \tilde{w}_{0,1} \\ \tilde{w}_{1,0} & \tilde{w}_{1,1} \end{bmatrix},$$

and columns of W are normalized to $$\frac{1}{\sqrt{2}},$$

where $$\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}$$

(weighted combination of L beams), $b_{k_1,k_2}$ is an oversampled 2D DFT beam, $b_{k_1^{(i)} k_2^{(i)}}$ are orthogonal for each $i=0\sim L-1$, L is configurable, $L \in \{2,3,4\}$, r=0, 1 (polarization ("pol")), l=0,1 (layer), $i=0\sim L-1$ (beam), $p_{r,l,i}^{(WB)}$ represents a wideband (WB) beam amplitude scaling factor, $p_{r,l,i}^{(SB)}$ represents a subband (SB) beam amplitude scaling factor, and $c_{r,l,i}$ represents a beam combining coefficient (phase). The precoding vector is configurable between quadrature phase shift keying (QPSK) modulation (2 bits) and 8-phase phase shift keying (8PSK) modulation (3 bits), and an amplitude scaling mode is configurable between wideband (WB) and subband (SB) (with unequal bit allocation) and WB-only.

As indicated above, FIG. 3 is provided as an example. Other examples may differ from what is described with regard to FIG. 3.

CSI includes a downlink channel estimate and may include interference information for interference at the UE. CSI is conveyed from the UE to a base station via CSI feedback. The base station relies on the CSI conveyed via the CSI feedback to perform downlink scheduling and beamforming, among other operations. Accurate CSI at the base station improves link and system level performance via more accurate multiple input multiple output (MIMO) beamforming and link adaptation. On the other hand, delivering accurate CSI requires a large feedback overhead. As a result, CSI is compactly encoded using a precoding codebook and coarse quantization before being transmitted back to the base station.

For example, Type-II CSI feedback in NR is based on a quantized representation of the downlink channel estimate into a rank indicator (RI), a selection of oversampled DFT-based beams, and heavily quantized wideband and subband amplitude and phase values. A UE may obtain a downlink channel estimate based on a CSI reference signal (CSI-RS). The CSI feedback may include information about which beams are selected, and magnitude coefficients and phases for wideband and for subband. Thus, CSI overhead can be rather large.

The existing approach for Type-II CSI feedback has other drawbacks. CSI may be an ad-hoc representation or construction that is suboptimal and inefficient. CSI is not generic or adaptive, and may instead be dependent on a particular antenna structure, such as a uniform linear array antenna structure at a single panel. A UE may expend a lot of power, and processing and signaling resources, providing CSI with a large overhead.

According to various aspects described herein, machine learning, such as training a neural network model, may be used to better encode CSI to achieve lower CSI feedback overhead, higher CSI accuracy, and/or better adaptability to different antenna structures and radio frequency environments. Once encoded, the original CSI may be reconstructed by using another neural network that is trained to convert the encoded CSI into the original CSI. Machine learning is an approach, or a subset, of artificial intelligence, with an emphasis on learning rather than just computer programming. In machine learning, a device may utilize complex models to analyze a massive amount of data, recognize patterns among the data, and make a prediction without requiring a person to program specific instructions. Deep learning is a subset of machine learning, and may use massive amounts of data and computing power to simulate deep neural networks. Essentially, these networks classify datasets and find correlations between the datasets. Deep learning can acquire newfound knowledge (without human intervention), and can apply such knowledge to other datasets.

In some aspects, a transmitting device, such as a UE, may use encoder weights from a trained neural network model, to encode CSI into a more compact representation of CSI that is accurate. As a result of using encoder weights of a trained neural network model for a CSI encoder and using decoder weights of the trained neural network model for a CSI decoder, the encoded CSI that the UE transmits may be smaller (more compressed) and/or more accurate than without using machine learning.

Additionally, or alternatively, the UE may take advantage of a correlation in CSI feedback across frequency, antennas, and/or time. For example, the UE may encode only a changed part of the CSI (compared to previous CSI), and thus provide a smaller size CSI feedback with the same reconstruction quality. A receiving device, such as a base station, may receive the changed part as encoded CSI and decode the changed part using decoder weights from the training. The base station may determine decoded CSI from decoding the changed part and from previously decoded CSI. If only a changed part is sent as encoded CSI, the UE and the base station may transmit and receive a much smaller CSI. The UE may save power, and processing and signaling resources, by providing accurate CSI with reduced overhead.

Figure 4:
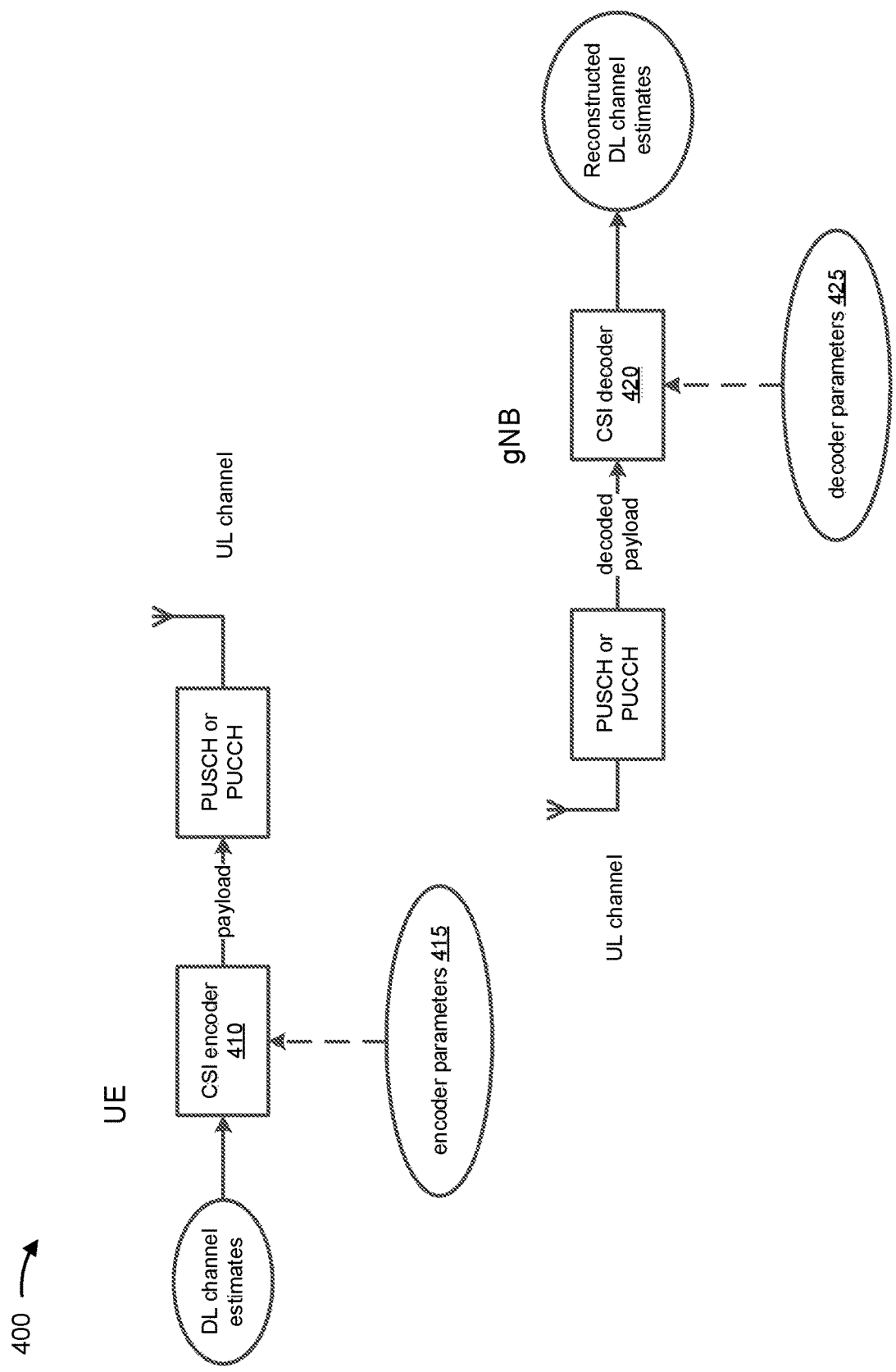
FIG. 4 illustrates an example of a CSI encoder and a CSI decoder, in accordance with various aspects of the present disclosure.

FIG. 4 illustrates an example 400 of a CSI encoder and a CSI decoder, in accordance with various aspects of the present disclosure. FIG. 4 shows a UE with a CSI encoder 410 that uses encoder parameters 415, and a base station (e.g., gNB) with a CSI decoder 420 that uses decoder parameters 425.

As shown by FIG. 4, CSI encoder 410 may receive and encode one or more downlink (DL) channel estimates. CSI encoder 410 may encode the one or more DL channel estimates and any interference information using encoder parameters 415. Encoder parameters 415 may include encoder weights obtained from machine learning, such as from a training of a neural network model associated with a CSI encoder and a CSI decoder. The training may have been performed by another device and such encoder weights may have been provided to CSI encoder 410, or CSI encoder 410 may be configured based at least in part on specified encoder weights. A neural network model may be characterized by a structure that indicates how neural network layers are composed in the neural network model. CSI encoder 410 may also be configured based at least in part on one or more encoder structures of the neural network model.

CSI encoder 410 may provide encoded CSI as a payload on a physical uplink shared channel (PUSCH) or a physical uplink control channel (PUCCH), for transmission on an uplink (UL) channel to the gNB. The gNB may receive the encoded CSI, and CSI decoder 420 may decode the encoded CSI into decoded CSI using decoder parameters 425. Decoder parameters 425 may include decoder weights obtained from machine learning, such as from the training of the neural network model associated with a CSI encoder and a CSI decoder. CSI decoder 420 may also be configured based at least in part on one or more decoder structures of the neural network model. CSI decoder 420 may reconstruct one or more DL channel estimates based at least in part on the decoded CSI. The decoded CSI may also include interference information, and the DL channel estimates that are reconstructed may be similar to the one or more DL channel estimates that were encoded by encoder 410.

In some aspects, a device may train a neural network model to determine the encoder and decoder weights. The device may train the neural network model by encoding a CSI instance into encoded CSI with a CSI encoder, decoding the encoded CSI into decoded CSI with a CSI decoder, and comparing the CSI instance and the decoded CSI. For example, CSI may include an RI, one or more beam indices, a PMI, or one or more coefficients indicating an amplitude or phase of the channel estimates or beamforming directions, and comparing the CSI instance and the decoded CSI includes comparing each of the fields comprising the CSI in the CSI instance and the decoded CSI. As another example, CSI may include the channel estimate and interference information, and comparing the CSI instance and the decoded CSI includes comparing the channel estimate and interference information contained in the CSI instance and the decoded CSI.

The CSI encoder and the CSI decoder may be trained as a pair. The device may determine the encoder and decoder weights based at least in part on a difference between the CSI instance and the decoded CSI. The device may train the neural network with a target difference, attempting to minimize the difference while also trying to minimize a size of the encoded CSI. In one scenario, encoded CSI may be more accurate, but larger in size. In another scenario, encoded CSI may be smaller, but less accurate. There is a balance between encoded CSI accuracy and encoded CSI size. The device may determine to select more accuracy rather than a smaller size, or select less accuracy to have a smaller size. The device may transmit the encoder weights and the decoder weights from the training to another device, such as a UE (e.g., CSI encoder 410) or a base station (e.g., CSI decoder 420). The device may also transmit one or more encoder structures of the neural network model and/or one or more decoder structures of the neural network model. The device that performs the training may also be the UE and/or the base station.

As indicated above, FIG. 4 is provided as an example. Other examples may differ from what is described with regard to FIG. 4.

Figure 5:
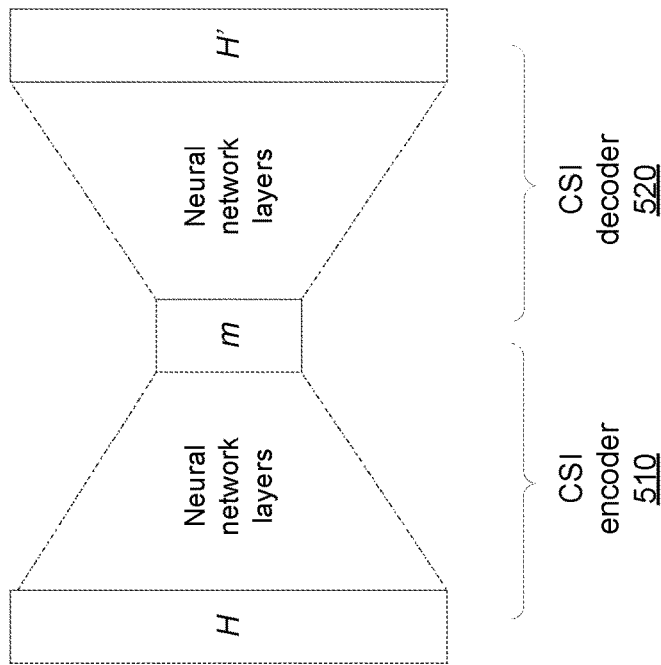
FIG. 5 illustrates an example of a neural network model associated with a CSI encoder and a CSI decoder, in accordance with various aspects of the present disclosure.

FIG. 5 illustrates an example 500 of a neural network model associated with a CSI encoder and a CSI decoder, in accordance with various aspects of the present disclosure. FIG. 5 shows that a device may train the neural network model using a CSI encoder 510 and CSI decoder 520 that are paired together.

As shown by FIG. 5, CSI encoder 510 may encode a downlink channel estimate H into encoded CSI m, which may be represented as $m \triangleq f_{enc,\theta}(H)$. Encoded CSI m may have a smaller size (in terms of a quantity of bits) than H. CSI encoder 510 and CSI decoder 520 may be designed and trained in such a way that the decoder can approximately recover the CSI encoder input H. The decoded CSI $\hat{H}$ may be represented by $\hat{H} \triangleq f_{dec,\phi}(m) = f_{dec,\phi}(f_{enc,\theta}(H))$.

In some aspects, a device may train the neural network model to minimize a certain metric, such as a loss function. The loss function may be a difference or change between H and $\hat{H}$. For example, there may be a distance measure (e.g., Euclidean distance) between a vector of H and a vector of $\hat{H}$. Encoding function $f_{enc}$ and decoding function $f_{dec}$ may be trained such that H and $\hat{H}$ are close. The device may train the neural network model based at least in part on a target distance measure and/or on a target size for m.

As shown in FIG. 5, the neural network model may be a succession of layers that each operate on input and provide an output. The layers may include an input layer, an output layer that produces output variables (e.g., encoder or decoder weights), and hidden layers between the input layer and the output layer. The layers may include one or more feed forward layers (e.g., one or more fully-connected pre-processing layers). If there are more than three layers, the neural network model may include deep learning, or may be a multi-task learning deep neural network model.

In some aspects, each of the layers may include neurons that represent data or operations. A device (e.g., UE, gNB, desktop computer, laptop, server, smart phone, tablet, and/or the like) that trains the neural network model may combine outputs of neuron clusters at one layer into a single neuron in a next layer. Some layers may provide patterns and overlaps between patterns to recurrent layers of the trained neural network model. In some aspects, the neural network model may be a recurrent neural network (RNN), and each recurrent layer may include a number of long short-term memory (LSTM) units. CSI encoder 510 and CSI decoder 520 may be trained via unsupervised learning, using DL (or UL) channel estimates as unlabeled data. CSI encoder 510 and CSI decoder 520 may be trained using an auto-encoder structure.

The device may train the neural network model to generate a trained neural network model. The device may provide training data to the neural network model and receive predictions based at least in part on providing the training data to the neural network model. Based at least in part on the predictions, the device may update the neural network model and provide the estimates to the updated neural network model. The device may repeat this process until a threshold level of accuracy for predictions are generated by the neural network model. The device may obtain encoder weights and decoder weights based at least in part on the predictions. These weights may be distributed to an encoder in a CSI transmitting device (e.g., UE) and a decoder in a CSI receiving device (e.g., gNB), or the weights may be part of an initial configuration for the UE and gNB that is specified beforehand.

In some aspects, a CSI transmitting device (e.g., UE) may perform the training, obtain the encoder and decoder weights, use the encoder weights, and provide the decoder weights to a base station with a decoder. For example, based at least in part on a minimum quantity of DL channel observations (e.g., from CSI-RSs), the UE may determine encoder weights θ and decoder weights ϕ from a trained neural network model. The UE may transmit the decoder weights ϕ to the gNB. The gNB may request the training or the training may be performed periodically. The UE may also autonomously perform the training. For each CSI feedback instance, the UE may feed back $m = f_{enc,\theta}(H)$ for the estimated downlink channel H. The gNB may reconstruct an approximate downlink channel via $\hat{H} = f_{dec,\phi}(m)$.

Additionally, or alternatively, a CSI receiving device (e.g., the gNB) may perform the training, obtain the encoder weights and the decoder weights, provide the encoder weights to the encoder, and use the decoder weights. For example, based at least in part on a minimum quantity of UL channel observations (e.g., from sounding reference signals), the gNB may determine encoder weights θ and decoder weights ϕ from a trained neural network model. The gNB may transmit the encoder weights θ to the gNB. The gNB may request the training or the training may be performed periodically. The UE may also autonomously perform the training. For each CSI feedback instance, the UE feeds back $m = f_{enc,\theta}(H)$ for the estimated downlink channel H. The gNB may reconstruct an approximate downlink channel via $\hat{H} = f_{dec,\phi}(m)$.

In some aspects, the UE or the gNB may receive or create an initial set of encoder weights and an initial set of decoder weights. The UE or the base station may use the training to update the initial set of encoder weights and the initial set of decoder weights.

In some aspects, a neural network model may have encoder structures and/or decoder structures. A structure may indicate how neural network layers are composed (e.g., how many layers, how many nodes per layer, how layers are connected, what operations are performed (convolutional, fully connected, recurrent neural network, etc.) in each layer). For a neural network model of a particular structure, training may include determining weights (parameters) of the neural network model based at least in part on training data. Thus, a device may determine a neural network structure for a neural network model and then train the neural network model to determine the weights. In some aspects, a neural network model may refer to a structure or both the structure and the weights that are trained. A "model transfer" may denote a process of conveying the neural network weights (and optionally the neural network structure if unknown by another party) to the other party. For purposes of discussion, a structure, in some aspects, may refer to the structure without weights, and a neural network model may refer to a structure plus weights (which may or may not have been trained). A trained neural network model may to refer to a structure plus trained weights.

As indicated above, FIG. 5 is provided as an example. Other examples may differ from what is described with regard to FIG. 5.

Figure 6:
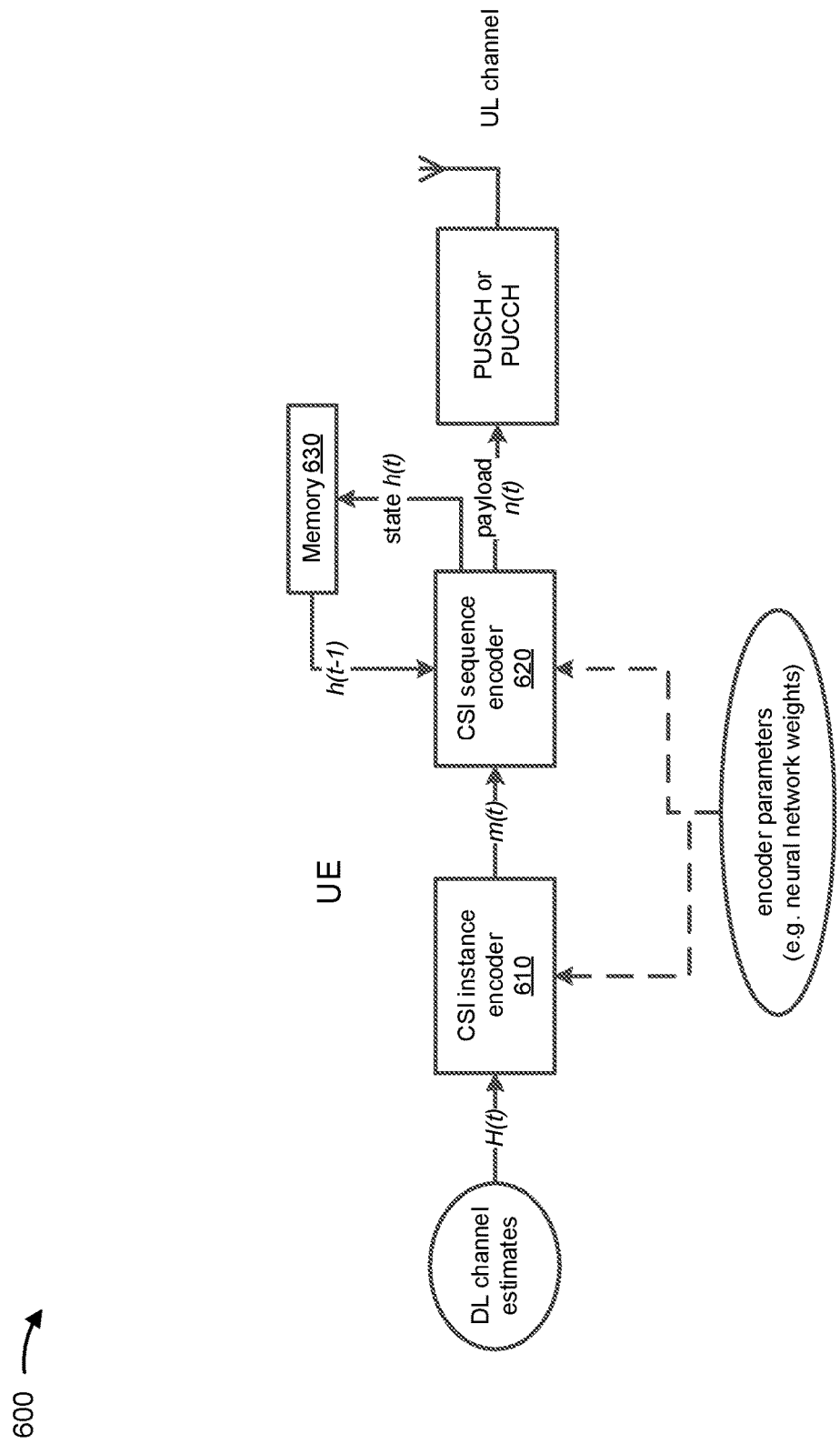
FIGS. 6 and 7 illustrate an example of an encoder and a decoder that use previously stored CSI, in accordance with various aspects of the present disclosure.
Figure 7:
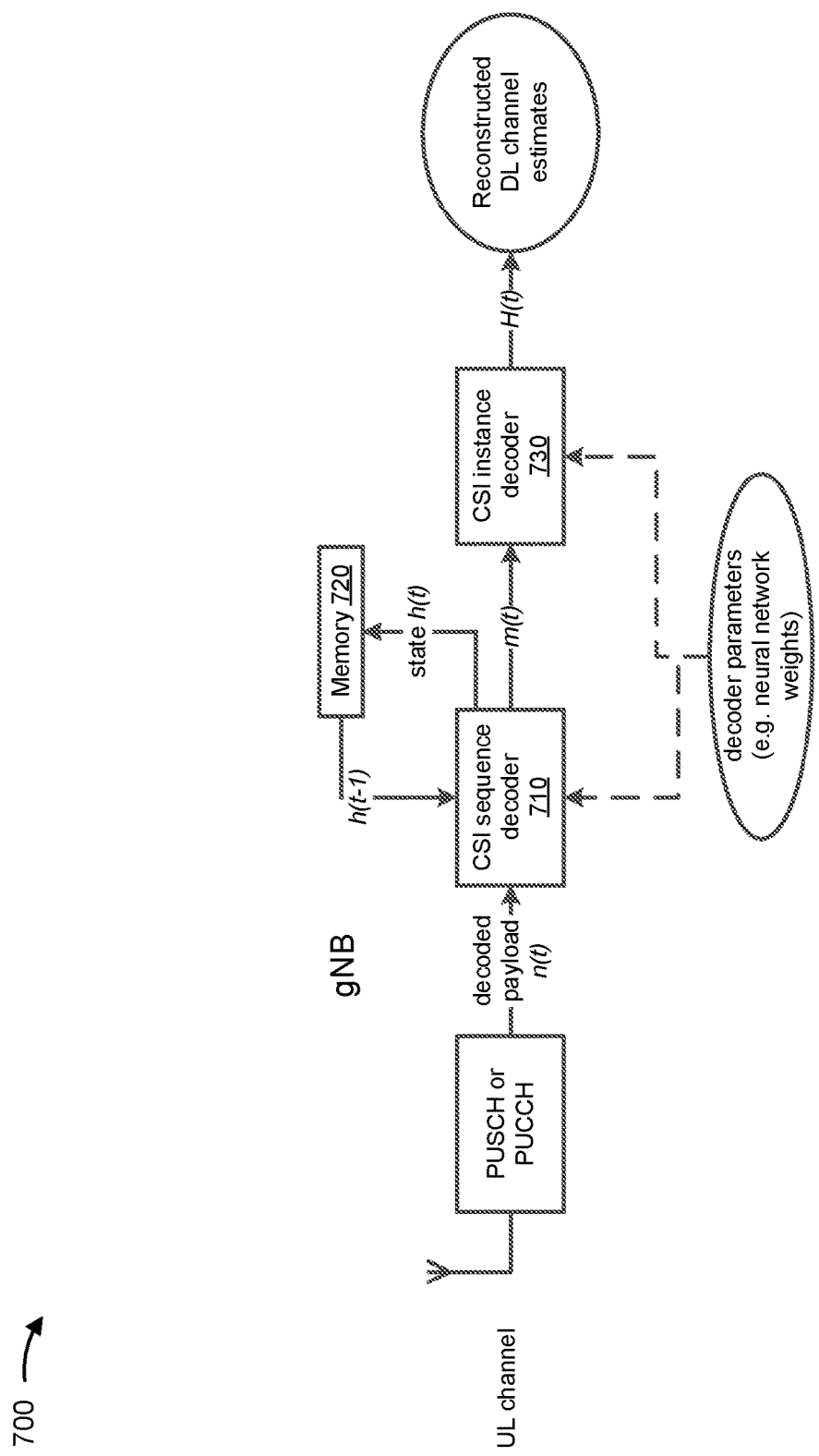

FIGS. 6 and 7 illustrate an example 600, 700 of an encoder and a decoder that use previously stored CSI, in accordance with various aspects of the present disclosure. FIG. 6 shows a UE (e.g., UE 120 depicted in FIGS. 1 and 2) with a CSI instance encoder 610, a CSI sequence encoder 620, and a memory 630. FIG. 6 shows a gNB (e.g., BS 110 depicted in FIGS. 1 and 2) with a CSI sequence decoder 710, a memory 720, and a CSI instance decoder 730.

In some aspects, an encoder and a decoder may take advantage of a correlation of CSI instances over time (temporal aspect), or over a sequence of CSI instances for a sequence of channel estimates. The UE and the gNB may save and use previously stored CSI and encode and decode only a change in the CSI from a previous instance. This may provide for less CSI feedback overhead and improve performance. UEs may also be able to encode more accurate CSI, and neural networks may be trained with more accurate CSI.

As shown in FIG. 6, CSI instance encoder 610 of the UE may encode a CSI instance into intermediate encoded CSI for each DL channel estimate in a sequence of DL channel estimates. CSI instance encoder 610 may use neural network encoder weights θ. The intermediate encoded CSI may be represented as $m(t) \triangleq f_{enc,\theta}(H(t))$. CSI sequence encoder 620 may determine a previously encoded CSI instance h(t−1) from memory 630 and compare the intermediate encoded CSI m(t) and the previously encoded CSI instance h(t−1) to determine a change n(t) in the encoded CSI. The change n(t) may be a part of a channel estimate that is new and may not be predicted by the decoder. The encoded CSI at this point may be represented by $[n(t), h_{enc}(t)] \triangleq g_{enc,\theta}(m(t), h_{enc}(t-1))$. CSI sequence encoder 620 may provide this change n(t) on the PUSCH or PUCCH, and the UE may transmit the change (e.g., information indicating the change) n(t) as the encoded CSI on the UL channel to the gNB. Because the change is smaller than an entire CSI instance, the UE may send a smaller payload for the encoded CSI on the UL channel, while including more detailed information in the encoded CSI for the change. CSI sequence encoder 620 may generate encoded CSI h(t) based at least in part on the intermediate encoded CSI m(t) and at least a portion of the previously encoded CSI instance h(t−1). CSI sequence encoder 620 may save the encoded CSI h(t) in memory 630.

As shown in FIG. 7, CSI sequence decoder 710 may receive encoded CSI on the PUSCH or PUCCH. CSI sequence decoder 710 may determine that only the change n(t) of CSI is received as the encoded CSI. CSI sequence decoder 710 may determine an intermediate decoded CSI m(t) based at least in part on the encoded CSI and at least a portion of a previous intermediate decoded CSI instance h(t−1) from memory 720 and the change. CSI instance decoder 730 may decode the intermediate decoded CSI m(t) into decoded CSI. CSI sequence decoder 710 and CSI instance decoder 720 may use neural network decoder weights ϕ. The intermediate decoded CSI may be represented by $[\hat{m}(t), h_{dec}(t)] \triangleq g_{dec,\phi}(n(t), h_{dec}(t-1))$. CSI sequence decoder 710 may generate decoded CSI h(t) based at least in part on the intermediate decoded CSI m(t) and at least a portion of the previously decoded CSI instance h(t−1). The gNB may reconstruct a DL channel estimate from the decoded CSI h(t), and the reconstructed channel estimate may be represented as $\hat{H}(t) \triangleq f\_(dec, \phi)(\hat{m}(t))$. CSI sequence decoder 710 may save the decoded CSI h(t) in memory 720.

Because the change n(t) is smaller than an entire CSI instance, the UE may send a smaller payload on the UL channel. For example, if the DL channel has changed little from previous feedback, due to a low Doppler or little movement by the UE, an output of the CSI sequence encoder may be rather compact. In this way, the UE may take advantage of a correlation of channel estimates over time. In some aspects, because the output is small, the UE may include more detailed information in the encoded CSI for the change. In some aspects, the UE may transmit an indication (e.g., flag) to the gNB that the encoded CSI is temporally encoded (a CSI change). Alternatively, the UE may transmit an indication that the encoded CSI is encoded independently of any previously encoded CSI feedback. The gNB may decode the encoded CSI without using a previously decoded CSI instance. In some aspects, a device, which may include the UE or the gNB, may train a neural network model using a CSI sequence encoder and a CSI sequence decoder.

In some aspects, CSI may be a function of a channel estimate (referred to as a channel response) H and interference N. There may be multiple ways to convey H and N. For example, the UE may encode the CSI as $N^{-1/2}H$. The UE may encode H and N separately. The UE may partially encode H and N separately, and then jointly encode the two partially encoded outputs. Encoding H and N separately maybe advantageous. Interference and channel variations may happen on different time scales. In a low Doppler scenario, a channel may be steady but interference may still change faster due to traffic or scheduler algorithms. In a high Doppler scenario, the channel may change faster than a scheduler-grouping of UEs. In some aspects, a device, which may include the UE or the gNB, may train a neural network model using separately encoded H and N.

In some aspects, a reconstructed DL channel $\hat{H}$ may faithfully reflect the DL channel H, and this may be called explicit feedback. In some aspects, $\hat{H}$ may capture only that information required for the gNB to derive rank and precoding. CQI may be fed back separately. CSI feedback may be expressed as m(t), or as n(t) in a scenario of temporal encoding. Similarly to Type-II CSI feedback, m(t) may be structured to be a concatenation of RI, beam indices, and coefficients representing amplitudes or phases. In some aspects, m(t) may be a quantized version of a real-valued vector. Beams may be pre-defined (not obtained by training), or may be a part of the training (e.g., part of θ and ϕ and conveyed to the UE or the gNB).

In some aspects, the gNB and the UE may maintain multiple encoder and decoder networks, each targeting a different payload size (for varying accuracy vs. UL overhead tradeoff). For each CSI feedback, depending on a reconstruction quality and an uplink budget (e.g., PUSCH payload size), the UE may choose, or the gNB may instruct the UE to choose, one of the encoders to construct the encoded CSI. The UE may send an index of the encoder along with the CSI based at least in part on an encoder chosen by the UE. Similarly, the gNB and the UE may maintain multiple encoder and decoder networks to cope with different antenna geometries and channel conditions. Note that while some operations are described for the gNB and the UE, these operations may also be performed by another device, as part of a preconfiguration of encoder and decoder weights and/or structures.

As indicated above, FIGS. 6 and 7 may be provided as an example. Other examples may differ from what is described with regard to FIGS. 6 and 7.

Figure 8:
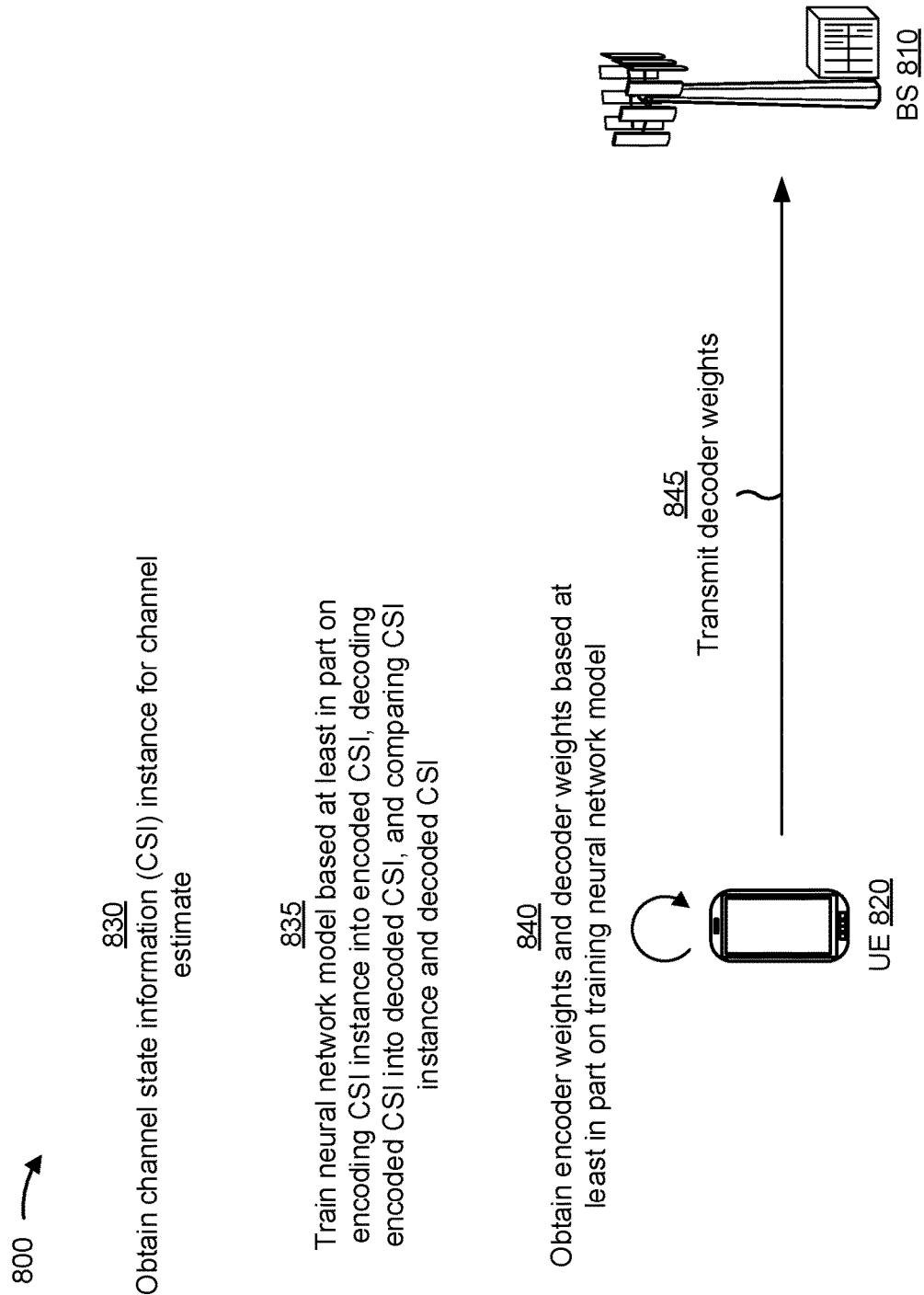
FIG. 8 illustrates an example of neural network based CSI feedback, in accordance with various aspects of the present disclosure.

FIG. 8 illustrates an example 800 of neural network based CSI feedback, in accordance with various aspects of the present disclosure. FIG. 8 shows a UE 820 (e.g., UE 120 depicted in FIGS. 1 and 2, the UE depicted in FIGS. 4, 6, and 7, and/or the like) that may communicate with a BS 810 (e.g., BS 110 depicted in FIGS. 1 and 2, the gNB depicted in FIGS. 4, 6, and 7, and/or the like). FIG. 8 shows operations performed by UE 820 that may also be performed by BS 810, or another device.

As shown by reference number 830, UE 820 may obtain a CSI instance for a channel estimate for a channel to BS 810. In some aspects, a call flow for initial access by the UE may precede UE 820 obtaining a CSI instance. This call flow may include a non-access stratum (NAS) exchange of a UE context by BS 810. BS 810 may retrieve the UE context from a core network. The UE context may include one or more trained neural network models for CSI, including for CSI encoders or CSI decoders. There may be different BS configurations, different neural network structures, different feedback overheads, and/or the like.

UE 820 may determine a neural network model. UE 820 may select and/or receive a trained neural network model associated with a CSI encoder and a CSI decoder in a radio resource control (RRC) configuration message. The RRC message may configure UE 820 for certain uplink control information and an available CSI encoder-CSI decoder pair. An RRC message may update the UE context with a CSI encoder or a CSI decoder. In some aspects, a vendor specific neural network model may be a starting point. Additionally, or alternatively, UE 820 may create the neural network model, based at least in part on information about neural network structures, layers, weights, and/or the like.

As shown by reference number 835, UE 820 (or BS 810) may train and update the CSI encoder and the CSI decoder. UE 820 may train (or further train) a neural network model based at least in part on encoding a CSI instance into encoded CSI, decoding the encoded CSI, and comparing the CSI instance and the decoded CSI. The CSI encoder and the CSI decoder may share a generic architecture of a deep learning neural network. The CSI encoder and the CSI decoder may maintain respective hidden states, and UE 820 may encode CSI, and BS 810 may decode encoded CSI, based at least in part on the hidden states. UE 820 may inform BS 810 that a hidden state is reset.

As shown by reference number 840, UE 820 may obtain encoder weights and decoder weights based at least in part on training the neural network model. As shown by reference number 845, UE 820 may transmit the decoder weights to BS 810. UE 820 may also update encoder weights of the encoder that UE 820 used to encode CSI.

As indicated above, FIG. 8 is provided as an example. Other examples may differ from what is described with regard to FIG. 8.

Figure 9:
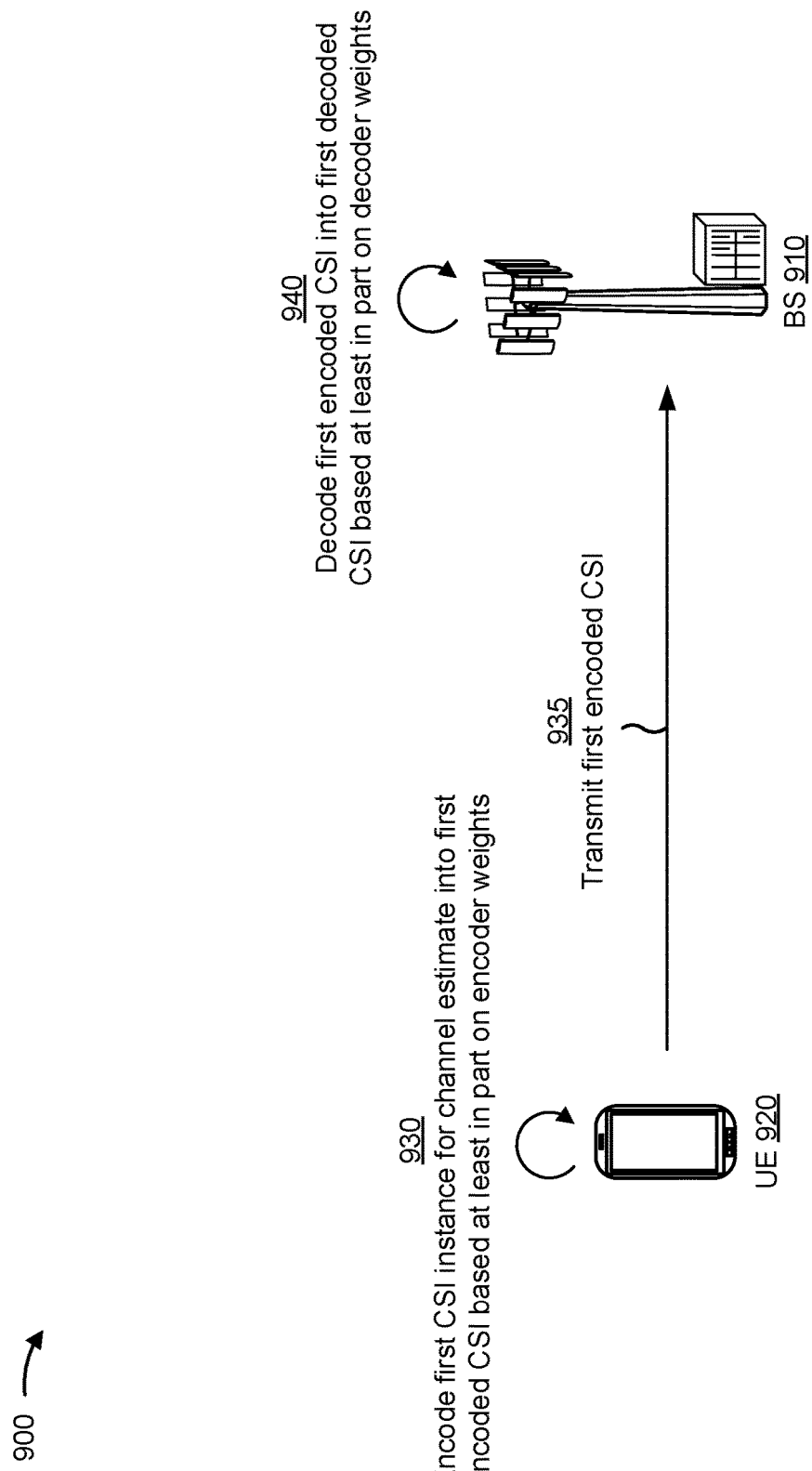
FIG. 9 illustrates an example of neural network based CSI feedback, in accordance with various aspects of the present disclosure.

FIG. 9 illustrates an example 900 of neural network based CSI feedback, in accordance with various aspects of the present disclosure. FIG. 9 shows a UE 920 (e.g., UE 120 depicted in FIGS. 1 and 2, the UE depicted in FIGS. 4, 6, and 7, UE 820 depicted in FIG. 8, and/or the like) that may communicate with a BS 910 (e.g., BS 110 depicted in FIGS. 1 and 2, the gNB depicted in FIGS. 4, 6, and 7, BS 810 depicted in FIG. 8, and/or the like).

As shown by reference number 930, UE 920 may encode a first CSI instance for a channel estimate into a first encoded CSI based at least in part on encoder weights. The encoder weights may be specified in stored configuration information. Additionally, or alternatively, UE 920 may have received the encoder weights, or determined the encoder weights from training a neural network model associated with a CSI encoder and a CSI decoder.

As shown by reference number 935, UE 920 may transmit the first encoded CSI to BS 910. As shown by reference number 940, BS 910 may decode the first encoded CSI into first decoded CSI based at least in part on decoder weights. BS 910 may have received the decoder weights, or determined the decoder weights from training a neural network model associated with a CSI encoder and a CSI decoder.

As indicated above, FIG. 9 is provided as an example. Other examples may differ from what is described with regard to FIG. 9.

Figure 10:
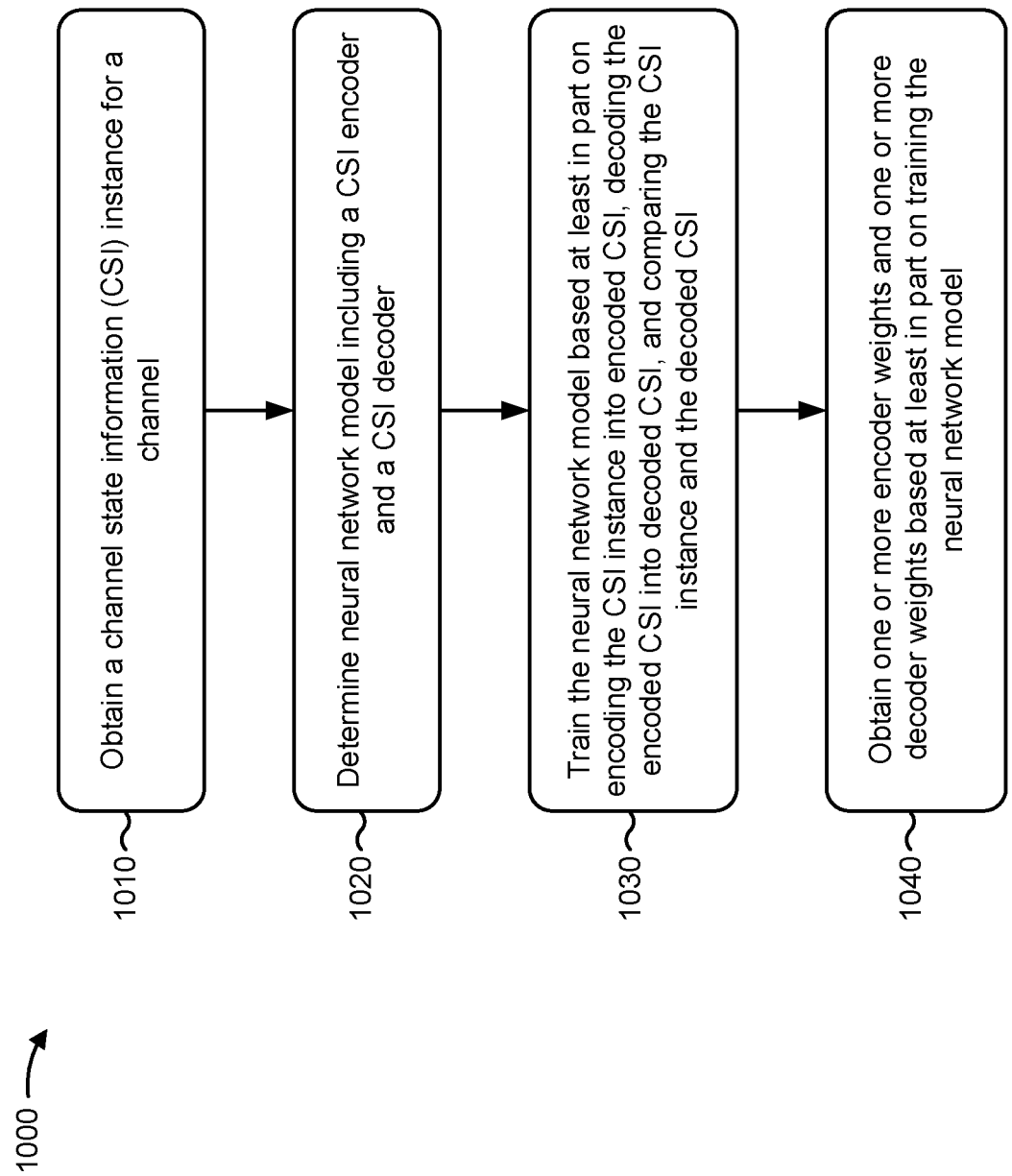
FIG. 10 is a diagram illustrating an example process performed, for example, by a device, in accordance with various aspects of the present disclosure.

FIG. 10 is a diagram illustrating an example process 1000 performed, for example, by a device, in accordance with various aspects of the present disclosure. Example process 1000 is an example where the device (e.g., BS 110 or UE 120 depicted in FIGS. 1 and 2, BS 810 or UE 820 depicted in FIG. 8, a desktop computer, a laptop, a server, a smart phone, a tablet, and/or the like) performs operations associated with neural network based CSI feedback.

As shown in FIG. 10, in some aspects, process 1000 may include obtaining a first CSI instance for a channel (block 1010). For example, the device (e.g., using antenna 252, receive processor 258, controller/processor 280, memory 282, antenna 234, receive processor 238, controller/processor 240, memory 242, and/or the like) may obtain a first CSI instance for a channel, as described above.

As further shown in FIG. 10, in some aspects, process 1000 may include determining a neural network model that includes a CSI encoder and a CSI decoder (block 1020). For example, the device (e.g., using controller/processor 280, memory 282, controller/processor 240, memory 242, and/or the like) may determine a neural network model that includes a CSI encoder and a CSI decoder, as described above.

As further shown in FIG. 10, in some aspects, process 1000 may include training the neural network model based at least in part on encoding the CSI instance into encoded CSI, decoding the encoded CSI into decoded CSI, and comparing the CSI instance and the decoded CSI (block 1030). For example, the device (e.g., using controller/processor 280, memory 282, controller/processor 240, memory 242, and/or the like) may train the neural network model based at least in part on encoding the CSI instance into encoded CSI, decoding the encoded CSI into decoded CSI, and comparing the CSI instance and the decoded CSI, as described above.

As further shown in FIG. 10, in some aspects, process 1000 may include obtaining one or more encoder weights and one or more decoder weights based at least in part on training the neural network model (block 1040). For example, the device (e.g., using controller/processor 280, memory 282, controller/processor 240, memory 242, and/or the like) may obtain one or more encoder weights and one or more decoder weights based at least in part on training the neural network model, as described above.

Process 1000 may include additional aspects, such as any single aspect or any combination of aspects described below and/or in connection with one or more other processes described elsewhere herein.

In a first aspect, the device is a UE, the channel is a downlink channel, and process 1000 includes transmitting one or more decoder structures of the neural network model and the one or more decoder weights to a base station.

In a second aspect, alone or in combination with the first aspect, the device is a base station, the channel is an uplink channel, and process 1000 includes transmitting one or more encoder structures of the neural network model and the one or more encoder weights to a UE.

In a third aspect, alone or in combination with one or more of the first and second aspects, comparing the CSI instance and the decoded CSI includes computing a distance measure between a vector of the CSI instance and a vector of the decoded CSI.

In a fourth aspect, alone or in combination with one or more of the first through third aspects, training the neural network model includes training the neural network model based at least in part on a target distance measure.

In a fifth aspect, alone or in combination with one or more of the first through fourth aspects, the distance measure is a Euclidean distance.

In a sixth aspect, alone or in combination with one or more of the first through fifth aspects, training the neural network model includes training the neural network model based at least in part on a target size of the encoded CSI.

In a seventh aspect, alone or in combination with one or more of the first through sixth aspects, the CSI instance includes one or more of an RI, one or more beam indices, a PMI, or one or more coefficients indicating an amplitude or phase.

In an eighth aspect, alone or in combination with one or more of the first through seventh aspects, encoding the CSI instance includes encoding the CSI instance into an intermediate encoded CSI, and encoding the intermediate encoded CSI into the encoded CSI based at least in part on the intermediate encoded CSI and at least a portion of previously encoded CSI, and decoding the encoded CSI into the decoded CSI includes decoding the encoded CSI into an intermediate decoded CSI based at least in part on the encoded CSI and at least a portion of a previous intermediate decoded CSI, and decoding the intermediate decoded CSI into the decoded CSI based at least in part on the intermediate decoded CSI.

In a ninth aspect, alone or in combination with one or more of the first through eighth aspects, the CSI instance includes the channel estimate and interference information, and encoding the CSI instance includes encoding the channel estimate into an encoded channel estimate, encoding the interference information into encoded interference information, and jointly encoding the encoded channel estimate and the encoded interference information into the encoded CSI, and decoding the encoded CSI includes decoding the encoded CSI into an encoded channel estimate and encoded interference information, decoding the encoded channel estimate into a decoded channel estimate, decoding the encoded interference information into decoded interference information, and determining the decoded CSI based at least in part on the decoded channel estimate and the decoded interference information.

In a tenth aspect, alone or in combination with one or more of the first through ninth aspects, encoding the CSI instance includes encoding the CSI instance into a binary sequence.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
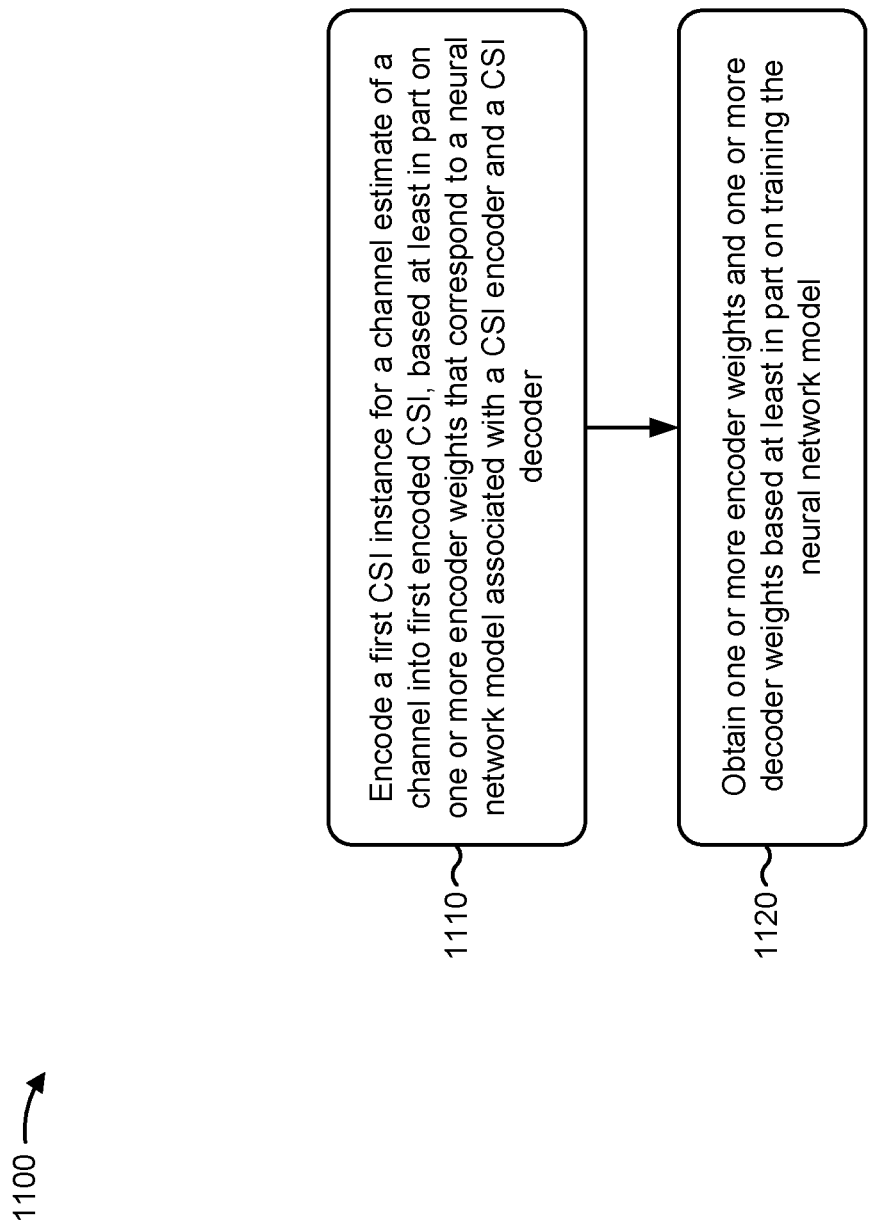
FIG. 11 is a diagram illustrating an example process performed, for example, by a UE that transmits communications on a channel to a base station, in accordance with various aspects of the present disclosure.

FIG. 11 is a diagram illustrating an example process 1100 performed, for example, by a UE that transmits communications on a channel to a base station, in accordance with various aspects of the present disclosure. Example process 1100 is an example where the UE (e.g., UE 120 depicted in FIGS. 1 and 2, UE 820 depicted in FIG. 8, and/or the like) performs operations associated with neural network based CSI feedback.

As shown in FIG. 11, in some aspects, process 1100 may include encoding a first CSI instance for a channel estimate of the channel into first encoded CSI, based at least in part on one or more encoder weights that correspond to a neural network model associated with a CSI encoder and a CSI decoder (block 1110). For example, the UE (e.g., using controller/processor 280, memory 282, and/or the like) may encode a first CSI instance for a channel estimate of the channel into first encoded CSI, based at least in part on one or more encoder weights that correspond to a neural network model associated with a CSI encoder and a CSI decoder, as described above.

As further shown in FIG. 11, in some aspects, process 1100 may include transmitting the first encoded CSI to the base station (block 1120). For example, the UE (e.g., using controller/processor 280, memory 282, transmit processor 264, antenna 252, and/or the like) may transmit the first encoded CSI to the base station, as described above.

Process 1100 may include additional aspects, such as any single aspect or any combination of aspects described below and/or in connection with one or more other processes described elsewhere herein.

In a first aspect, encoding the first CSI instance includes encoding the first CSI instance into an intermediate encoded CSI, and encoding the intermediate encoded CSI into the first encoded CSI based at least in part on the intermediate encoded CSI and at least a portion of previously encoded CSI.

In a second aspect, alone or in combination with the first aspect, process 1100 includes comprising transmitting information to the base station indicating whether the first CSI instance is encoded independently of a previously encoded CSI instance or encoded based at least in part on a previously encoded CSI instance.

In a third aspect, alone or in combination with one or more of the first and second aspects, the first CSI instance includes the channel estimate and interference information, and encoding the first CSI instance includes encoding the channel estimate into an encoded channel estimate, encoding the interference information into encoded interference information, and jointly encoding the encoded channel estimate and the encoded interference information into the first encoded CSI.

In a fourth aspect, alone or in combination with one or more of the first through third aspects, process 1100 includes obtaining a second CSI instance for the channel, training a neural network model based at least in part on encoding the second CSI instance into second encoded CSI, decoding the second encoded CSI into second decoded CSI, and comparing the second CSI instance and the second decoded CSI, and updating the one or more encoder weights based at least in part on training the neural network model.

In a fifth aspect, alone or in combination with one or more of the first through fourth aspects, process 1100 includes determining one or more decoding weights based at least in part on training the neural network model, and transmitting the one or more decoding weights to the base station.

In a sixth aspect, alone or in combination with one or more of the first through fifth aspects, encoding the first CSI instance includes encoding the first CSI instance into a binary sequence.

In a seventh aspect, alone or in combination with one or more of the first through sixth aspects, encoding the first CSI instance includes selecting an encoder based at least in part on one or more of an antenna configuration of the UE, a beam configuration of the UE, or channel conditions.

In an eighth aspect, alone or in combination with one or more of the first through seventh aspects, where the first CSI instance includes one or more of an RI, one or more beam indices, a PMI, or one or more coefficients indicating an amplitude or phase.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
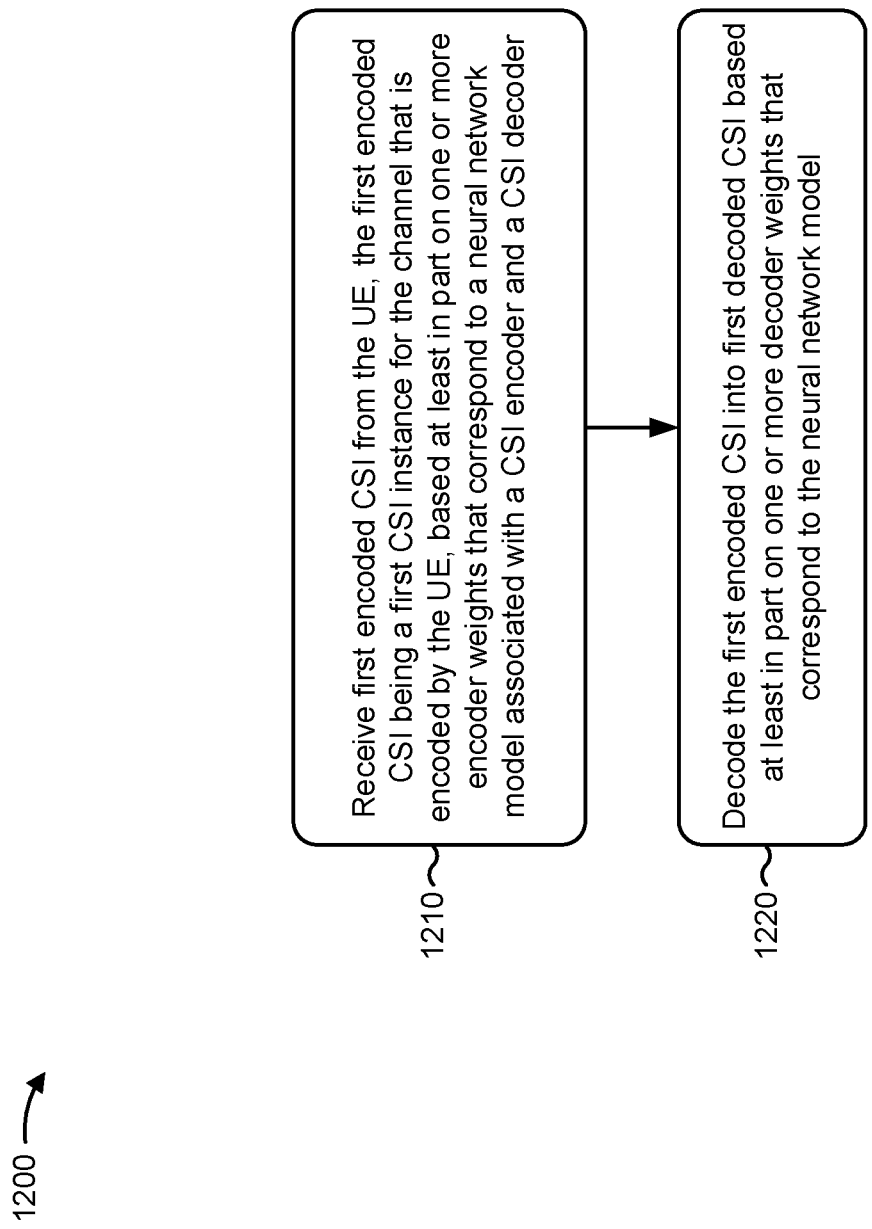
FIG. 12 is a diagram illustrating an example process performed, for example, by a base station that receives communications on a channel from a UE, in accordance with various aspects of the present disclosure.

FIG. 12 is a diagram illustrating an example process 1200 performed, for example, by a base station that receives communications on a channel from a UE, in accordance with various aspects of the present disclosure. Example process 1200 is an example where the base station (e.g., BS 110 depicted in FIGS. 1 and 2, BS 810 depicted in FIG. 8, and/or the like) performs operations associated with neural network based CSI feedback.

As shown in FIG. 12, in some aspects, process 1200 may include receiving first encoded CSI from the UE, based at least in part on one or more encoder weights that correspond to a neural network model associated with a CSI encoder and a CSI decoder (block 1210). For example, the base station (e.g., using receive processor 238, controller/processor 240, memory 242, and/or the like) may receive first encoded CSI from the UE, based at least in part on one or more encoder weights that correspond to a neural network model associated with a CSI encoder and a CSI decoder, as described above. In some aspects, the first encoded CSI is a first CSI instance for the channel that is encoded by the UE.

As further shown in FIG. 12, in some aspects, process 1200 may include decoding the first encoded CSI into first decoded CSI based at least in part on one or more decoder weights that correspond to the neural network model (block 1220). For example, the base station (e.g., using controller/processor 240, memory 242, and/or the like) may decode the first encoded CSI into first decoded CSI based at least in part on one or more decoder weights that correspond to the neural network model, as described above.

Process 1200 may include additional aspects, such as any single aspect or any combination of aspects described below and/or in connection with one or more other processes described elsewhere herein.

In a first aspect, decoding the first encoded CSI into the first decoded CSI includes decoding the first encoded CSI into an intermediate decoded CSI based at least in part on the first encoded CSI and at least a portion of a previous intermediate decoded CSI, and decoding the intermediate decoded CSI into the first decoded CSI based at least in part on the intermediate decoded CSI.

In a second aspect, alone or in combination with the first aspect, process 1200 includes receiving information from the UE, indicating that the first CSI instance is encoded independently of a previously encoded CSI instance, and decoding the first encoded CSI includes decoding the first encoded CSI independently of previous intermediate decoded CSI.

In a third aspect, alone or in combination with one or more of the first and second aspects, decoding the first encoded CSI includes decoding the first encoded CSI into an encoded channel estimate and encoded interference information, decoding the encoded channel estimate into a decoded channel estimate, decoding the encoded interference information into decoded interference information, and determining the first decoded CSI based at least in part on the decoded channel estimate and the decoded interference information.

In a fourth aspect, alone or in combination with one or more of the first through third aspects, process 1200 includes obtaining a second CSI instance for the channel, training a neural network model based at least in part on encoding the second CSI instance into second encoded CSI, decoding the second encoded CSI into second decoded CSI, and comparing the second CSI instance and the second decoded CSI, and updating the one or more decoder weights based at least in part on training the neural network model.

In a fifth aspect, alone or in combination with one or more of the first through fourth aspects, process 1200 includes determining one or more encoder weights based at least in part on training the neural network model, and transmitting the one or more encoder weights to the UE.

In a sixth aspect, alone or in combination with one or more of the first through fifth aspects, decoding the first encoded CSI instance includes decoding the first CSI instance from a binary sequence.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE) that transmits communications on a channel to a network node, comprising:
   encoding, based at least in part on one or more encoder weights corresponding to a neural network model associated with a channel state information (CSI) encoder and a CSI decoder, a first CSI instance for a channel into an intermediate encoded CSI;
   encoding a change in the intermediate encoded CSI from a previously encoded CSI, associated with a previously encoded CSI instance, into first encoded CSI; and
   transmitting the first encoded CSI, comprising only the change in the intermediate encoded CSI from the previously encoded CSI, to the network node as a payload on a physical uplink shared channel (PUSCH) or a physical uplink control channel (PUCCH),
   wherein at least one of:
      the one or more encoder weights are received by the UE from the network node, or
      one or more decoder weights, for decoding the first encoded CSI, are transmitted by the UE to the network node.

2. The method of claim 1, further comprising transmitting information to the network node indicating that the first CSI instance is encoded based at least in part on the previously encoded CSI instance.

3. The method of claim 1, wherein the first CSI instance includes a first channel estimate and first interference information,
   wherein the previous CSI instance includes a second channel estimate, different from the first channel estimate, and second interference information different from the first interference information, and
   wherein encoding the intermediate encoded CSI includes encoding the first channel estimate into an encoded channel estimate, encoding the first interference information into encoded interference information, and jointly encoding the encoded channel estimate and the encoded interference information into the first encoded CSI.

4. The method of claim 1, wherein the first CSI instance is encoded into a binary sequence.

5. The method of claim 1, further comprising selecting an encoder based at least in part on one or more of an antenna configuration of the UE, a beam configuration of the UE, or channel conditions,
   wherein the first CSI instance is encoded based at least in part on selecting the encoder.

6. The method of claim 1, wherein the first CSI instance includes one or more of a rank indicator (RI), a beam index, a pre-coding matrix indicator (PMI), or a coefficient indicating an amplitude or phase.

7. The method of claim 1, further comprising:
   obtaining a second CSI instance for the channel;
   training the neural network model based at least in part on encoding the second CSI instance into second encoded CSI, decoding the second encoded CSI into second decoded CSI, and comparing the second CSI instance and the second decoded CSI; and
   updating the one or more encoder weights based at least in part on training the neural network model.

8. The method of claim 1, wherein transmitting the first encoded CSI comprises:
   transmitting the first encoded CSI and an indication that the first encoded CSI is temporally encoded.

9. A method of wireless communication performed by a network node that receives communications on a channel from a user equipment (UE), comprising:
   receiving first encoded channel state information (CSI), comprising only a change in an intermediate encoded CSI from a previously encoded CSI associated with a previously encoded CSI instance, from the UE as a payload on a physical uplink shared channel (PUSCH) or a physical uplink control channel (PUCCH),
   wherein the first encoded CSI is a first CSI instance for the channel that is encoded by the UE, based at least in part on one or more encoder weights that correspond to a neural network model associated with a CSI encoder and a CSI decoder;
   decoding the first encoded CSI into intermediate decoded CSI based at least in part on the change in the intermediate encoded CSI from the previously encoded CSI associated with a previously encoded CSI instance; and
   decoding the intermediate decoded CSI into first decoded CSI based at least in part on one or more decoder weights that correspond to the neural network model,
   wherein at least one of:
   the one or more encoder weights are transmitted by the network node to the UE, or
   the one or more decoder weights are received by the network node from the UE.

10. The method of claim 9, further comprising receiving information, from the UE, indicating that the first CSI instance is decoded independently of previous intermediate decoded CSI.

11. The method of claim 9, wherein decoding the intermediate CSI includes decoding the intermediate decoded CSI into an encoded channel estimate and encoded interference information, decoding the encoded channel estimate into a decoded channel estimate, decoding the encoded interference information into decoded interference information, and determining the first decoded CSI based at least in part on the decoded channel estimate and the decoded interference information.

12. The method of claim 9, wherein the first encoded CSI is decoded from a binary sequence.

13. The method of claim 9, wherein receiving the first encoded CSI comprises:
   receiving the first encoded CSI and an indication that the first encoded CSI is temporally encoded.

14. A user equipment (UE) that transmits communications on a channel to a network node for wireless communication, comprising:
   one or more memories; and
   one or more processors coupled to the one or more memories, the one or more processors configured to:
      encode, based at least in part on one or more encoder weights corresponding to a neural network model associated with a channel state information (CSI) encoder and a CSI decoder, a first CSI instance for a channel into an intermediate encoded CSI;
      encode a change in the intermediate encoded CSI from a previously encoded CSI, associated with a previously encoded CSI instance, into first encoded CSI; and
      transmit the first encoded CSI, comprising only the change in the intermediate encoded CSI from the previously encoded CSI, to the network node as a payload on a physical uplink shared channel (PUSCH) or a physical uplink control channel (PUCCH),
      wherein at least one of:
         the one or more encoder weights are received by the UE from the network node, or
         one or more decoder weights, for decoding the first encoded CSI, are transmitted by the UE to the network node.

15. The UE of claim 14, wherein the one or more processors are further configured to:
   obtain a second CSI instance for the channel;
   train the neural network model based at least in part on encoding the second CSI instance into second encoded CSI, decoding the second encoded CSI into second decoded CSI, and comparing the second CSI instance and the second decoded CSI; and
   update the one or more encoder weights based at least in part on training the neural network model.

16. The UE of claim 15, wherein the one or more processors are further configured to train the neural network model based at least in part on one or more of a target size of the second encoded CSI or a target distance measure between the second CSI instance and the second decoded CSI.

17. The UE of claim 14, wherein, to transmit the first encoded CSI, the one or more processors are configured to:
   transmit the first encoded CSI and an indication that the first encoded CSI is temporally encoded.

18. A network node that receives communications on a channel from a user equipment (UE) for wireless communication, comprising:
   one or more memories; and
   one or more processors coupled to the one or more memories, the one or more processors configured to:
      receive first encoded channel state information (CSI), comprising only a change in an intermediate encoded CSI from a previously encoded CSI associated with a previously encoded CSI instance, from the UE as a payload on a physical uplink shared channel (PUSCH) or a physical uplink control channel (PUCCH),
      wherein the first encoded CSI is a first CSI instance for the channel that is encoded by the UE, based at least in part on one or more encoder weights that correspond to a neural network model associated with a CSI encoder and a CSI decoder;
      decode the first encoded CSI into intermediate decoded CSI based at least in part on the change in the intermediate decoded CSI from; and
      decode the intermediate decoded CSI into first decoded CSI based at least in part on one or more decoder weights that correspond to the neural network model,
      wherein at least one of:
         the one or more encoder weights are transmitted by the network node to the UE, or
         the one or more decoder weights are received by the network node from the UE.

19. The network node of claim 18, wherein the one or more processors are configured to:
   obtain a second CSI instance for the channel;
   train a neural network model based at least in part on encoding the second CSI instance into second encoded CSI, decoding the second encoded CSI into second decoded CSI, and comparing the second CSI instance and the second decoded CSI; and
   update the one or more decoder weights based at least in part on training the neural network model.

20. The network node of claim 19, wherein the one or more processors are further configured to train the neural network model based at least in part on one or more of a target size of the second encoded CSI or a target distance measure between the second CSI instance and the second decoded CSI.

21. The network node of claim 18, wherein, to receive the first encoded CSI, the one or more processors are configured to:
   receive the first encoded CSI and an indication that the first encoded CSI is temporally encoded.

22. A non-transitory computer-readable medium storing a set of instructions for wireless communication, the set of instructions comprising:
   one or more instructions that, when executed by one or more processors of a user equipment (UE) that transmits communications on a channel to a network node, cause the UE to:
      encode, based at least in part on one or more encoder weights corresponding to a neural network model associated with a channel state information (CSI) encoder and a CSI decoder, a first CSI instance for a channel into first encoded CSI into an intermediate encoded CSI;
      encode a change in the intermediate encoded CSI from a previously encoded CSI, associated with a previously encoded CSI instance, into first encoded CSI; and
      transmit the first encoded CSI, comprising only the change in the intermediate encoded CSI from the previously encoded CSI, to the network node as a payload on a physical uplink shared channel (PUSCH) or a physical uplink control channel (PUCCH),
      wherein at least one of:
         the one or more encoder weights are received by the UE from the network node, or one or more decoder weights, for decoding the first encoded CSI, are transmitted by the UE to the network node.

23. The non-transitory computer-readable medium of claim 22, wherein the one or more instructions further cause the UE to transmit information to the network node indicating that the first CSI instance is encoded based at least in part on the previously encoded CSI instance.

24. The non-transitory computer-readable medium of claim 22, wherein the first CSI instance includes a first channel estimate and first interference information,
   wherein the previous CSI instance includes a second channel estimate, different from the first channel estimate, and second interference information different from the first interference information, and
   wherein encoding the intermediate encoded CSI includes encoding the first channel estimate into an encoded channel estimate, encoding the first interference information into encoded interference information, and jointly encoding the encoded channel estimate and the encoded interference information into the first encoded CSI.

25. The non-transitory computer-readable medium of claim 22, wherein the first CSI instance is encoded into a binary sequence.

26. The non-transitory computer-readable medium of claim 22, wherein the one or more instructions further cause the UE to select an encoder based at least in part on one or more of an antenna configuration of the UE, a beam configuration of the UE, or channel conditions, wherein the first CSI instance is encoded based at least in part on selecting the encoder.

27. The non-transitory computer-readable medium of claim 22, wherein the first CSI instance includes one or more of a rank indicator (RI), a beam index, a pre-coding matrix indicator (PMI), or a coefficient indicating an amplitude or phase.

28. The non-transitory computer-readable medium of claim 22, wherein the one or more instructions further cause the UE to:
   obtain a second CSI instance for the channel;
   train the neural network model based at least in part on encoding the second CSI instance into second encoded CSI, decoding the second encoded CSI into second decoded CSI, and comparing the second CSI instance and the second decoded CSI; and
   update the one or more encoder weights based at least in part on training the neural network model.

29. The non-transitory computer-readable medium of claim 28, wherein the one or more instructions further cause the UE to train the neural network model based at least in part on one or more of a target size of the second encoded CSI or a target distance measure between the second CSI instance and the second decoded CSI.

30. The non-transitory computer-readable medium of claim 22, wherein the one or more instructions, when executed by the one or more processors of the UE to transmit the first encoded CSI, cause the UE to:
   transmit the first encoded CSI and an indication that the first encoded CSI is temporally encoded.

\* \* \* \* \*